No. 858,473. PATENTED JULY 2, 1907.
J. C. SANDERS.
HOSE SUPPORTER.
APPLICATION FILED JUNE 25, 1906.
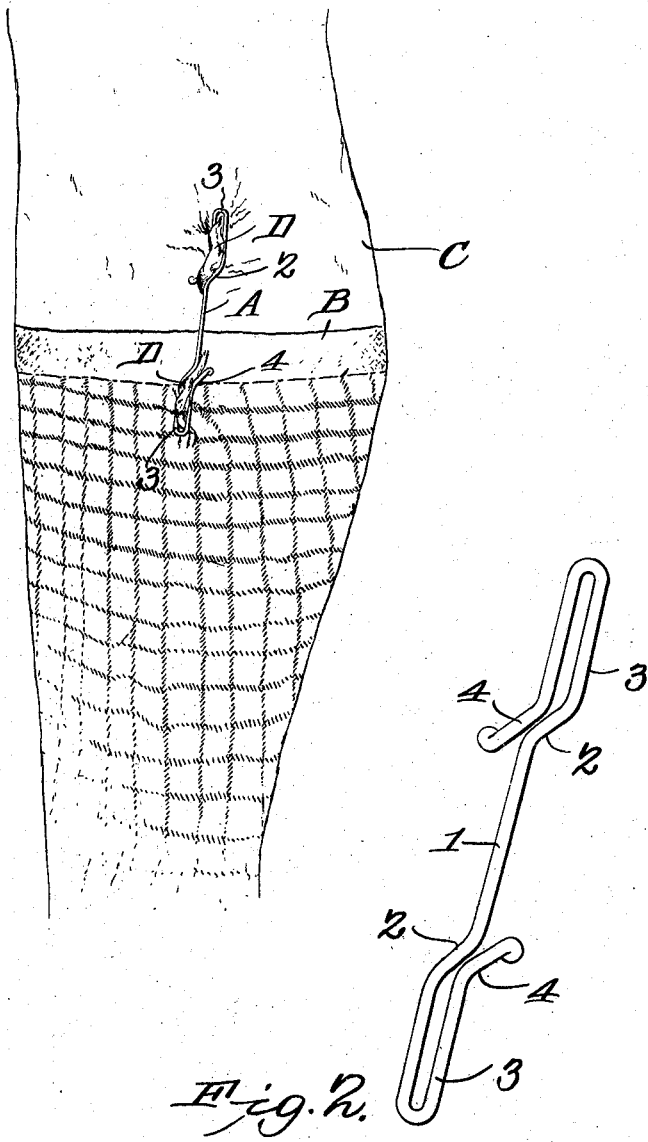
WITNESSES:
E. T. Stewart
Chattie Bradway
John C. Sanders, INVENTOR.
By C. A. Snow & Co
ATTORNEYS

UNITED STATES PATENT OFFICE.

JOHN C. SANDERS, OF HARRISBURG, PENNSYLVANIA, ASSIGNOR, BY DIRECT AND MESNE ASSIGNMENTS, OF ONE-THIRD TO GEORGE ADAM SEIBERT AND ONE-THIRD TO FRANK E. WATKINS, BOTH OF HARRISBURG, PENNSYLVANIA.

HOSE-SUPPORTER.

No. 858,473.　　　Specification of Letters Patent.　　　Patented July 2, 1907.

Application filed June 25, 1906. Serial No. 323,351.

*To all whom it may concern:*

Be it known that I, JOHN C. SANDERS, a citizen of the United States, residing at Harrisburg, in the county of Dauphin and State of Pennsylvania, have invented a new and useful Hose-Supporter, of which the following is a specification.

This invention relates to an improved fastening device for articles of wearing apparel, and it relates more particularly to a supporter for hose.
The objects of the invention are to improve and simplify devices of this character by constructing them of metal wire, so as to do away with elastic bands or other members commonly used in hose supporters, and so that they can be manufactured at small cost, and are extremely easy to use.

In carrying out the invention, I construct the hose supporter with two spring clamps or hooks which attach to the hose to be supported and to the drawers or other garment, and the hooks are connected by an intermediate portion of the shank.

According to the preferred form of the invention, the structure comprises a single piece of wire formed into a shank, and at the ends thereof are two oppositely inclined portions, from each of which latter extend the spring clamps or hooks. The ends of the hooks are turned outwardly at the points adjacent the inclined portions, and parallel to the latter. The extremities extend to the sides of the shank on the supporter, so as to form between themselves and the shank a flaring entrance or mouth into which the article to which the supporter is to be attached can be easily inserted into the clamping springs.

For a more detailed understanding, reference is to be had to the following description, taken in connection with the accompanying drawing, and to the claims appended hereto.

In the accompanying drawing, which illustrates one embodiment of the invention, Figure 1 is a perspective view showing my improved hose supporter in use.
Fig. 2 is a perspective view of the hose supporter drawn on an enlarged scale.

Corresponding parts in the several figures are indicated throughout by similar characters of reference.

Referring to the drawing, A represents the hose supporter, B the hose, C the drawers and D the gathered parts of the hose and drawers that are inserted and tightly held in the spring clamps or hooks of the supporter.

The hose supporter is preferably made of a single piece of metal, such as wire, round in cross section and of a suitable gage to afford sufficient strength and resiliency. I prefer wire made from phosphor bronze, and though round cross section is desirable, any other shape may be employed.

The supporter comprises a shank 1 which at its ends connects with oppositely disposed inclined portions 2. As shown in Fig. 2, one portion inclines upwardly from the shank toward the right, while the other portion inclines downwardly to the left. From the inclined portions extend the substantially U-shaped spring clamps or hooks 3. The ends of these hooks extend into close proximity with the intermediate portions 2 and lie substantially in the same line with the shank 1. From adjacent the intermediate portions, the ends of the hook extend outwardly away from the shank on a line parallel with, or approximately so, the adjacent intermediate portion, as shown at 4. The extremities of the terminals 4 are rounded so as to present a better finish and prevent the ends from engaging in any fabrics they may come in contact with. By reason of the fact that the extremities or terminals 4 extend beyond the line of the shank, a wide flaring entrance or mouth is formed by which the gathered portions of the articles to which the hook is to be attached can be readily inserted into the spring hooks or clamps 3.

It is evident that with the fastening device, as shown, various articles of apparel can be attached to each other in a very simple manner. When the fastener is used as a hose supporter, the same is applied by taking hold of the hose adjacent the top thereof and forming the fabric into a small gather and passing same into one of the clamping loops wherein it becomes firmly gripped. Then a suitable part of the drawers is gathered in the same manner and inserted into the other clamping loop. The hose is thus held in position until the same is detached from the supporter.

I have described the principle of operation of the invention, together with the apparatus which I now consider to be the best embodiment thereof, but I desire to have it understood that the apparatus shown is merely illustrative, and that certain changes as to minor details of construction and disposition of parts may be resorted to within the scope of the claims and without departing from the spirit of the invention.

What is claimed is:—

1. As an article of manufacture, a supporter comprising a shank, inclined members extending from the ends of the shank in opposite directions and to opposite sides of the latter, loops extending in the general direction of the shank from said inclined members and disposed with their ends alining with the shank, and outwardly inclined terminals at the ends of the loops which are disposed parallel to the inclined members and extend outwardly from the side of the shank opposite from the members.

2. As an article of manufacture, a supporter comprising in a single piece of wire a straight shank, inclined portions at the ends thereof, spring clamps extending in opposite directions from said portions and arranged with their ends in close proximity to the latter and in line with the shank, and terminals at said ends that extend parallel with and in close proximity to the said inclined portions and turn outwardly from the shank to form a mouth between each terminal and the adjacent end of the shank.

In testimony that I claim the foregoing as my own, I have hereto affixed my signature in the presence of two witnesses.

JOHN C. SANDERS.

Witnesses:
 MABEL UPDEGROVE,
 JOHN L. BATES.